(12) United States Patent
Books et al.

(10) Patent No.: US 10,151,290 B2
(45) Date of Patent: Dec. 11, 2018

(54) PROTECTING AN ENGINE IN AUTOMATIC STOP/START APPLICATIONS

(71) Applicant: Cummins, Inc., Columbus, IN (US)

(72) Inventors: Martin T. Books, Columbus, IN (US); John P. O'Brien, Columbus, IN (US); Jaideep Prasad, Columbus, IN (US); Jeffrey S. Rauch, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 15/559,249

(22) PCT Filed: Mar. 20, 2015

(86) PCT No.: PCT/US2015/021822
§ 371 (c)(1),
(2) Date: Sep. 18, 2017

(87) PCT Pub. No.: WO2016/153468
PCT Pub. Date: Sep. 29, 2016

(65) Prior Publication Data
US 2018/0112643 A1    Apr. 26, 2018

(51) Int. Cl.
*F02N 11/08*    (2006.01)
*F02D 41/08*    (2006.01)
*F02D 41/04*    (2006.01)
*F02D 41/06*    (2006.01)

(52) U.S. Cl.
CPC ........ *F02N 11/0829* (2013.01); *F02D 41/042* (2013.01); *F02D 41/06* (2013.01); *F02D 41/086* (2013.01); *F02D 2200/022* (2013.01); *F02D 2200/1006* (2013.01); *F02N 2200/023* (2013.01); *Y02T 10/48* (2013.01)

(58) Field of Classification Search
CPC ........... F02N 11/0829; F02N 2200/023; F02D 41/086; F02D 41/042; F02D 41/06; F02D 2200/022; F02D 2200/1006
USPC ....................................... 701/112; 123/179.4
See application file for complete search history.

(56) References Cited

U.S. PATENT DOCUMENTS

| | | |
|---|---|---|
| 5,653,659 A | 8/1997 | Kunibe et al. |
| 6,275,759 B1 | 8/2001 | Nakajima et al. |
| 6,817,329 B2 | 11/2004 | Buglione et al. |
| 7,091,629 B2 | 8/2006 | Hawkins |
| 7,751,964 B2 | 7/2010 | Dietz |
| 7,826,961 B2 | 11/2010 | Jinno |
| 7,869,932 B2 | 1/2011 | Boesch |

(Continued)

FOREIGN PATENT DOCUMENTS

WO    WO 2014/149297    9/2014

OTHER PUBLICATIONS

International Search Report and Written Opinion issued for PCT/US2015/021822, dated Jun. 16, 2015, 8 pages.

*Primary Examiner* — Mahmoud Gimie
(74) *Attorney, Agent, or Firm* — Foley & Lardner LLP (57) ABSTRACT

An apparatus includes an engine friction module in operative communication with an engine and structured to interpret engine operation data indicative of an engine friction amount, and a stop/start module structured to compare the engine operation data with predetermined protective criteria that includes an engine friction threshold and to turn off the engine for at least a portion of time based on the engine friction threshold exceeding the engine friction amount.

21 Claims, 3 Drawing Sheets

(56) References Cited

U.S. PATENT DOCUMENTS

| | | |
|---|---|---|
| 7,890,243 B2 | 2/2011 | Abendroth |
| 8,160,804 B2 | 4/2012 | Chominsky et al. |
| 2009/0183557 A1* | 7/2009 | Ono .................... F02D 41/0097 73/114.25 |
| 2011/0054744 A1 | 3/2011 | Brennan et al. |
| 2012/0167554 A1* | 7/2012 | Zhang .................... F01N 3/035 60/274 |
| 2012/0215429 A1 | 8/2012 | Yumisashi et al. |
| 2012/0225752 A1 | 9/2012 | Gonze et al. |
| 2013/0035815 A1* | 2/2013 | Ando .................... B60W 10/08 701/22 |
| 2016/0115931 A1* | 4/2016 | Ishikawa ............. F02N 11/0844 123/179.4 |

* cited by examiner

PROTECTING AN ENGINE IN AUTOMATIC STOP/START APPLICATIONS

CROSS-REFERENCE TO RELATED APPLICATIONS

The present application is a U.S. National Stage Application of PCT Application No. PCT/US2015/021822, filed on Mar. 20, 2015, the contents of which are incorporated herein by reference in their entirety.

BACKGROUND

Many vehicles are powered by an engine, which burns fuel to power the vehicle. Oftentimes, vehicle engines may remain on in an idle operating state even when a vehicle is not moving (e.g., when a vehicle is stopped at a stop sign, in a drive through, etc.). In such situations, fuel is still consumed by the engine even though the vehicle is not moving. Some vehicles address this problem by employing a stop/start system that automatically shuts down and restarts the engine under certain operating conditions to reduce the amount of fuel consumed by the engine. For example, an engine may be shut off when the vehicle remains in idle for extended periods of time, such as when the vehicle is stopped in a traffic jam, stopped at a train crossing, or placed in park. Stop/start features are typically combined with automatic engine restart. For example, an engine may automatically restart when a condition suggests the need to resume engine torque production (e.g., pressing the accelerator pedal, changing the vehicle from park to drive, etc.). Traditional stop/start features are implemented based on factors related to cost and/or convenience (e.g., fuel savings). Stop/start features are commonly employed in hybrid vehicles but can also be used in with other engine types.

SUMMARY

One embodiment relates to an apparatus that includes an engine friction module and a stop/start module. The engine friction module is in operative communication with the engine and structured to interpret engine operation data indicative of an engine friction amount. The stop/start module is structured to compare the engine operation data with predetermined protective criteria based on an engine friction threshold. The stop/start module is further structured to turn off the engine for at least a portion of time based on the engine friction threshold exceeding the engine friction amount.

Another embodiment relates to an apparatus that includes an exhaust module and a stop/start module. The exhaust module is in operative communication with an engine and structured to interpret engine operation data indicative of a temperature of an exhaust aftertreatment system. The stop/start module is structured to compare the interpreted engine operation data with predetermined protective criteria. The predetermined protective criteria includes an exhaust aftertreatment temperature threshold. The stop/start module is further structured to turn off the engine for at least a portion of time based on the temperature of the exhaust aftertreatment system exceeding the exhaust aftertreatment temperature threshold Another embodiment relates to an apparatus that includes an engine friction module, an exhaust module, and a stop/start module. The engine friction module is in operative communication with an engine and structured to interpret engine operation data indicative of an engine friction amount. The exhaust module is in operative communication with the engine and structured to interpret engine operation data indicative of a temperature of an exhaust aftertreatment system. The stop/start module is structured to compare the interpreted engine operation data with predetermined protective criteria. The predetermined protective criteria includes an engine friction threshold and an exhaust aftertreatment temperature threshold. The stop/start module is further structured to turn off the engine for at least a portion of time based on the engine friction threshold exceeding the engine friction amount and based on the temperature of the exhaust aftertreatment system exceeding the exhaust aftertreatment temperature threshold.

Another embodiment relates to a method. The method includes interpreting, by an engine friction module in operative communication with an engine, engine operation data indicative of an engine friction amount. The method further includes comparing, by a stop/start module, the interpreted engine operation data with predetermined protective criteria based on an engine friction threshold. The method further includes turning off the engine for at least a portion of time based on the engine friction threshold exceeding the engine friction amount.

DETAILED DESCRIPTION

Following below are more detailed descriptions of various concepts related to, and implementations of, methods, apparatuses, and systems for implementing a stop/start feature. The various concepts introduced above and discussed in greater detail below may be implemented in any number of ways, as the concepts described are not limited to any particular manner of implementation. Examples of specific implementations and applications are provided primarily for illustrative purposes.

Referring to the Figures generally, the various embodiments disclosed herein relate to systems and methods of protecting an engine of a vehicle in an automatic stop/start application. Historically, engine starting has been considered one of the most detrimental operating modes of an engine. During starting, the bearings have little or no lubrication. Furthermore, during the subsequent warm-up period, the engine may experience its highest temperature transients and certain emissions control devices, such as an exhaust gas aftertreatment system, may perform sub-optimally. Also during warm-up, the engine lubricant (e.g., oil, etc.) may remain fairly viscous such that a high torque is required to restart the engine, thereby requiring more electrical power to do so. Similarly, an engine may also be damaged by being shut down when the engine is too hot. For example, after prolonged periods of high-powered operation, portions of the engine may take a finite amount of time to adequately cool even when using a cooling system (e.g., a radiator, a water pump, etc.). Engine damage may also occur if an automatic stop occurs before the engine has sufficiently cooled down, for example, by the occurrence of heat soak-back. Accordingly, it will be appreciated that a stop/start feature, in some cases, should be disabled or temporarily refrain from stopping or starting the engine based on a characteristic of the engine, a current state of the engine, an operating condition of the engine, and so on.

According to an exemplary embodiment, the implementation of an automatic stop/start feature is based on criteria which indicate a low risk of causing physical damage or harm to the engine and engine components (i.e., protective criteria, etc.). In some embodiments, implementing the automatic stop/start feature may also be based on other criteria, such as fuel economy, convenience, and so on. Traditional approaches only use engine coolant temperature as an indicator and pre-condition for implementing an automatic stop/start feature. For example, an automatic engine stop/start feature may be permitted when engine coolant temperature exceeds some warm engine threshold. However, using engine coolant temperature as a pre-condition for implementing a stop/start feature provides no assurances that the engine is not damaged during the shutdown-restart procedure. For example, stopping and restarting an engine with cold engine coolant may not be harmful to an engine, but in severely cold environments, engine coolant temperature may be substantially influenced by the weather rather than the temperature of the engine itself. Furthermore, over-effective cooling systems may cause the engine coolant temperature to provide false indications of whether to enable the stop/start feature.

Systems and methods for basing a stop/start enabling metric on protective criteria that are more closely related to protecting an engine and components therefore are needed. Protective criteria may include critical engine criteria related to excessive wear and/or poor performance along with observable checks that act as indicators for enabling the stop/start feature. Protective criteria may be based on characteristics (e.g., engine operation data, etc.) relating to, but not limited to, engine friction levels, characteristics of an exhaust aftertreatment system (e.g., exhaust aftertreatment temperature), engine temperature (e.g., overall engine temperature, temperature of engine components, etc.), and so on.

Figure 1:
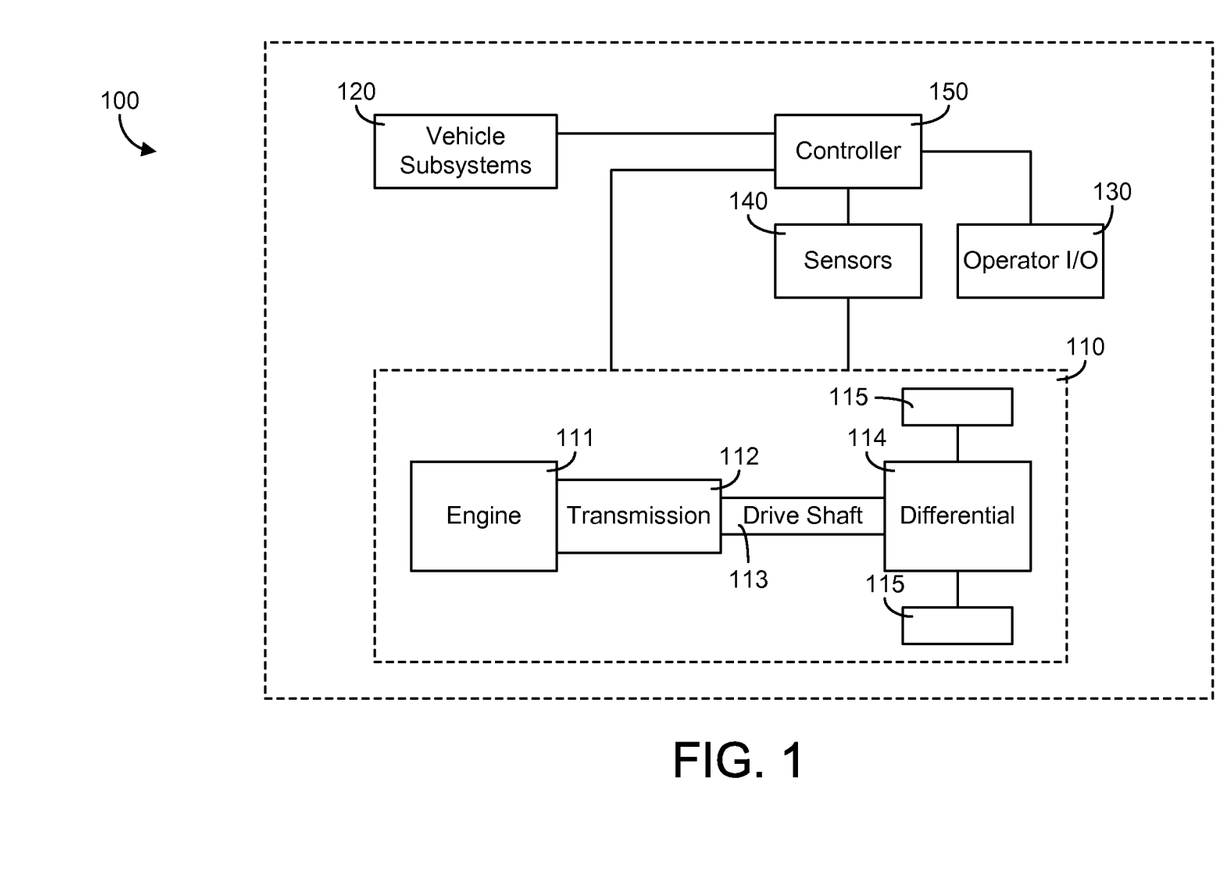
FIG. 1 is a schematic diagram of a vehicle with a controller, according to an exemplary embodiment.

Referring now to FIG. 1, a schematic diagram of a vehicle 100 with a controller 150 is shown according to an exemplary embodiment. The vehicle 100 may be an on-road or an off-road vehicle including, but not limited to, line-haul trucks, mid-range trucks (e.g., pick-up truck), cars (e.g., sedans, hatchbacks, coupes, etc.), and any other type of vehicle which may include a stop/start feature. Although FIG. 1 depicts the vehicle 100 as including an internal combustion engine 111, the vehicle 100 may be powered by any type of engine system. For example, the vehicle 100 may be a hybrid vehicle, a full electric vehicle, a hydrogen powered vehicle, and/or a vehicle powered by an internal combustion engine (as shown).

As shown in FIG. 1, the vehicle 100 generally includes a powertrain system 110, vehicle subsystems 120, an operator input/output (I/O) device 130, sensors 140 communicably coupled to one or more components of the vehicle 100, and a controller 150. These components are described more fully herein.

Components of the vehicle 100 may communicate with each other or foreign components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, etc. In one embodiment, a controller area network (CAN) bus provides the exchange of signals, information, and/or data. The CAN bus includes any number of wired and wireless connections. Because the controller 150 is communicably coupled to the systems and components in the vehicle 100 of FIG. 1, the controller 150 is structured to receive data regarding one or more of the components shown in FIG. 1. For example, the data may include engine operation data regarding the operating conditions (e.g., engine friction data, exhaust aftertreatment temperature data, engine temperature data, etc.) of the engine 111 and/or other components (e.g., an exhaust aftertreatment system, etc.) acquired by one or more sensors, such as sensors 140. As another example, the data may include an input from operator I/O device 130. As described more fully herein, the controller 150 may determine when it is permissible to enable the stop/start feature based on the engine operation data and/or based on protective criteria, which for example may indicate a low risk of causing physical damage or harm to the engine 111 and/or engine components.

As shown in FIG. 1, the powertrain system 110 includes an engine 111, a transmission 112, a drive shaft 113, a differential 114, and a final drive 115. As a brief overview, the engine 111 receives a chemical energy input (e.g., a fuel such as gasoline, diesel, etc.) and combusts the fuel to generate mechanical energy, in the form of a rotating crankshaft. The transmission 112 receives the rotating crankshaft and manipulates the speed of the crankshaft (e.g., the engine revolutions-per-minute (RPM), etc.) to affect a desired drive shaft speed. The rotating drive shaft 113 is received by the differential 114, which provides the rotation energy of the drive shaft 113 to the final drive 115. The final drive 115 then propels or moves the vehicle 100

The engine 111 may be structured as any engine type, including an internal combustion engine, and a full electric motor, among others. As shown, the engine 111 may be structured as any internal combustion engine (e.g., compression-ignition, spark-ignition, etc.) and may be powered by any fuel type (e.g., diesel, ethanol, gasoline, etc.). Similarly, the transmission 112 may be structured as any type of transmission, such as a continuous variable transmission, a manual transmission, an automatic transmission, an automatic-manual transmission, a dual clutch transmission, and so on.

Accordingly, as transmissions vary from geared to continuous configurations (e.g., continuous variable transmission), the transmission may include a variety of settings (gears, for a geared transmission) that affect different output speeds based on the engine speed. Like the engine 111 and the transmission 112, the drive shaft 113, differential 114, and final drive 115 may be structured in any configuration dependent on the application (e.g., the final drive 115 is structured as wheels in an automotive application and a propeller in a boat application, etc.). Further, the drive shaft 113 may be structured as any type of drive shaft including, but not limited to, a one-piece, two-piece, and a slip-in-tube driveshaft based on the application.

Referring still to FIG. 1, the vehicle 100 includes the vehicle subsystems 120. For example, a subsystem may include an exhaust aftertreatment system. The exhaust aftertreatment system may include any component used to reduce exhaust emissions, such as selective catalytic reduction (SCR) catalyst, a diesel oxidation catalyst (DOC), a diesel particulate filter (DPF), a diesel exhaust fluid (DEF) doser with a supply of diesel exhaust fluid, a plurality of sensors for monitoring the aftertreatment system (e.g., a nitrogen oxide (NOx) sensor, temperature sensors, etc.), and/or still other components.

The operator I/O device 130 may enable an operator of the vehicle 100 (or passenger) to communicate with the vehicle 100 and the controller 150. By way of example, the operator I/O device 130 may include, but is not limited to, an interactive display, a touchscreen device, one or more buttons and switches, voice command receivers, and the like. In one embodiment, the operator I/O device 130 includes a brake and an accelerator pedal which suggests the need to either end engine torque production with a stop feature (e.g., pressing the brake pedal such that the vehicle 100 comes to a stop, etc.) or resume engine torque production with a start feature (e.g., pressing the accelerator pedal from a stopped state, etc.).

As the components of FIG. 1 are shown to be embodied in the vehicle 100, the controller 150 may be structured as an electronic control module (ECM). The ECM may include a transmission control unit and any other vehicle control unit (e.g., exhaust aftertreatment control unit, powertrain control module, engine control module, etc.). The function and structure of the controller 150 is described in greater detail in FIG. 2.

Figure 2:
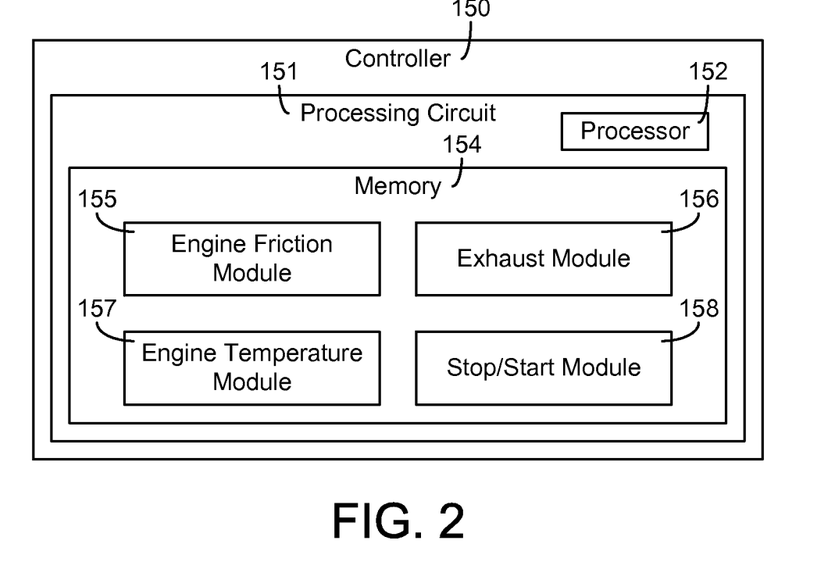
FIG. 2 is a schematic diagram of the controller of the vehicle of FIG. 1, according to an exemplary embodiment.

Referring now to FIG. 2, a schematic diagram of the controller 150 of the vehicle of FIG. 1 is shown according to an exemplary embodiment, including functional and structural components. As shown in FIG. 2, the controller 150 includes a processing circuit 151 including a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 154 (e.g., RAM, ROM, Flash Memory, hard disk storage, etc.) may store data and/or computer code for facilitating the various processes described herein. Thus, the one or more memory devices 154 may be communicably connected to the processor 152 and provide computer code or instructions to the processor 152 for executing the processes described in regard to the controller 150 herein. Moreover, the one or more memory devices 154 may be or include tangible, non-transient volatile memory or non-volatile memory. Accordingly, the one or more memory devices 154 may include database components, object code components, script components, or any other type of information structure for supporting the various activities and information structures described herein.

The memory 154 is shown to include various modules for completing the activities described herein. More particularly, the memory 154 includes modules configured to determine whether to implement the stop/start feature based on the protective criteria (e.g., by indicating the risk of causing physical damage or harm to the engine 111 and its components, etc.). While various modules with particular functionality are shown in FIG. 2, it should be understood that the controller 150 and memory 154 may include any number of modules for completing the functions described herein. For example, the activities of multiple modules may be combined as a single module, additional modules with additional functionality may be included, etc. Further, it should be understood that the controller 150 may control other vehicle activity beyond the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Figure 3:
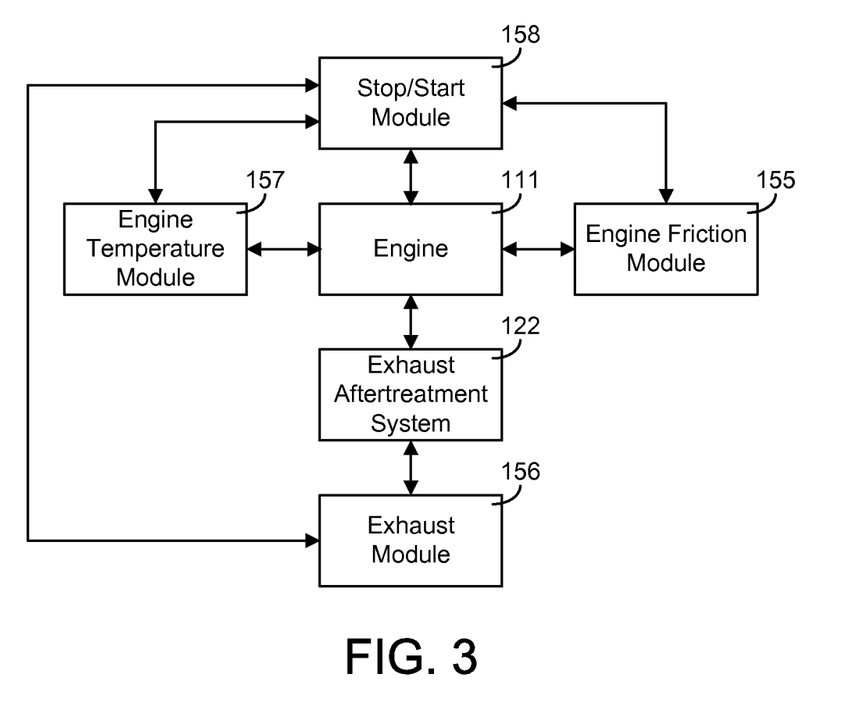
FIG. 3 is a schematic diagram of control modules of the controller of FIG. 2 in communication with components of the vehicle of FIG. 1, according to an exemplary embodiment.

As shown in FIG. 2, the controller 150 includes an engine friction module 155, an exhaust module 156, an engine temperature module 157, and a stop/start module 158. As shown in FIG. 3, the engine friction module 155 is in operative communication with the engine 111. In one embodiment, the engine friction module 155 is structured to receive and store engine friction data indicative of an engine friction amount acquired by one or one or more sensors such as sensors 140. In one embodiment, the engine friction data may be compared to an engine friction threshold based on engine oil temperature to determine whether the engine friction is less than the engine friction threshold, thereby facilitating substantially easy engine restart after the implementation of the stop/start feature (e.g., requiring a low torque input required to start the engine 111, etc.). As such, the implementation of the stop/start feature may be based on the engine friction data. In one embodiment, the sensors 140 include an engine oil temperature sensor. In one embodiment, the engine oil temperature sensor may be configured to acquire data regarding the temperature of the engine oil. The viscosity of the engine oil, and thus the engine friction, is dependent on the temperature of the engine oil. Accordingly, the engine oil temperature may be used to provide an indication of the engine friction amount. In one embodiment, for example, a temperature of the engine oil that is substantially warm or hot correlates to the engine oil currently having a low viscosity, thereby indicating an engine friction low enough to implement the stop/start feature.

In other embodiments, an engine oil temperature sensor may not be included. In one embodiment, the rotational friction of the engine 111 is determined by the amount of fueling required to idle the engine 111 at a constant speed (e.g., with an engine fuel gauge, etc.), which may indicate engine oil viscosity. The engine friction is then able to be determined based on the engine oil viscosity (e.g., via algorithms, estimations, look-up tables, etc.). In another embodiment, the engine 111 includes a positive displacement oil pump and an engine oil pressure sensor. The engine oil pressure sensor may be configured to acquire data regarding the pressure of the engine oil. With the positive displacement oil pump, the engine oil pressure becomes a function of pump speed (i.e., engine speed, etc.) and engine oil viscosity, providing an indication of engine friction. For example, warm or hot engine oil (i.e., oil with a low viscosity, etc.) may have a characteristically low engine oil pressure for a given engine speed. The engine friction may be determined by the controller 150 via the engine friction module 155 based on the engine oil pressure (e.g., via algorithms, estimations, look-up tables, etc.).

As shown in FIG. 3, the exhaust module 156 may be in operative communication with an exhaust aftertreatment system 122 that may be coupled to the engine 111 (i.e., the exhaust aftertreatment system 122 receives exhaust gas from the engine 111, etc.). In one embodiment, the exhaust module 156 is structured to receive and store exhaust aftertreatment temperature data indicative of a temperature of the exhaust aftertreatment system 122 acquired by one or one or more sensors such as sensors 140. In one embodiment, the sensors 140 include an exhaust aftertreatment temperature sensor configured to acquire data regarding the temperature of the exhaust aftertreatment system 122 (e.g., DPF inlet, SCR, etc.) and/or the exhaust gas. The exhaust aftertreatment temperature data is compared to an exhaust aftertreatment temperature threshold to determine whether the exhaust aftertreatment temperature is sufficient (e.g., above the exhaust aftertreatment temperature threshold, etc.) to support required chemical reactions (e.g., to reduce emissions, etc.). In one embodiment, for example, many engine operating points are set to be in compliance with one or more vehicular laws (e.g., emissions, etc.). However, during a warm-up period, the engine 111 may experience its highest temperature transients, and certain emissions control devices, such as the exhaust aftertreatment system 122, may therefore perform sub-optimally (e.g., do not always comply with the emission regulations, etc.). By stopping the engine 111 during the warm-up period, the vehicle 100 may operate in a state of non-compliance with the one or more vehicular laws for a longer period of time during subsequent start-ups. As such, in some embodiments, the implementation of the stop/start feature may be based on the exhaust aftertreatment temperature exceeding the exhaust aftertreatment temperature threshold. For example, low exhaust temperature may indicate the exhaust aftertreatment system 122 is not operating at a desired temperature, thereby preventing the implementation of the stop/start feature.

As shown in FIG. 3, the engine temperature module 157 may be in operative communication with the engine 111. In one embodiment, the engine temperature module 157 may be structured to receive and store engine temperature data indicative of an overall temperature of the engine 111 acquired by one or one or more sensors (e.g., sensors 140). The engine temperature data may be used to determine whether the overall engine temperature (e.g., temperature of the engine block, metal temperature, etc.) has stabilized at a warm-up temperature (e.g., a standard operating temperature, minimum engine temperature threshold, etc.). The overall engine temperature may also indicate the amount of engine friction in the engine 111. In one embodiment, the sensors 140 include an intake manifold temperature sensor. The intake manifold temperature sensor may be configured to acquire temperature data regarding the temperature of the intake manifold of the engine 111. The temperature data may be compared to a minimum engine temperature threshold to determine whether the temperature of the engine 111 has stabilized (e.g., the temperature of the intake manifold exceeds the minimum engine temperature threshold, etc.). In another embodiment, the determination of whether the overall engine temperature has stabilized is based on a total engine run time since starting the engine 111. For example, the controller 150 via the engine temperature module 157 may determine the overall engine temperature (e.g., via algorithms, estimations, look-up tables, etc.) based on the run time of the engine 111 and other internal/external characteristics (e.g., ambient temperature, engine speed, power output, etc.).

In still another embodiment, the determination of whether the overall engine temperature has stabilized is based on a wasted energy portion of the total fuel energy consumed by the engine 111 since starting the engine 111. For example, the total energy consumed by the engine 111 since starting may be represented by the following equation $$E_{Total} = K\int_0^t \dot{m}(t)dt \qquad (1)$$

where $E_{Total}$ is the total energy consumed by the engine 111, K is the fuel heating value, and $\dot{m}(t)$ is the mass flow rate of the fuel with respect to time. The mass of fuel consumed during the operation of the engine 111 since the last start-up may be determined by integrating the mass flow rate of the fuel from time "0" (e.g., time of start-up of engine 111, etc.) to time "t" (e.g., current time, time at which the calculation is made, etc.). The total energy of the fuel consumed by engine 111 may be determined by multiplying the heating value of the fuel and the mass of fuel.

With the total energy consumed by the engine 111, the useful work performed by the engine may be determined based on the efficiency of the engine 111 with respect to time (e.g., time of operation of engine 111 since start-up, etc.), as shown by the following expression $$W_{useful} = E_{total}\int_0^t \eta(t)dt = K\int_0^t \eta(t)\dot{m}(t)dt \qquad (2)$$

where $W_{useful}$ is the useful work performed by the engine 111 and $\eta(t)$ is the efficiency of the engine 111 over time (the instantaneous efficiencies are synchronized with the fueling values).

The wasted energy (e.g., thermal energy, heat, etc.) may also be determined from the difference between the total energy consumed by the engine 111 (e.g., Equation (1), etc.) and the useful work performed by the engine 111 (e.g., Equation (2), etc.) as presented in the following expression $$E_{wasted} = E_{Total} - W_{useful} = K\int_0^t [1-\eta(t)]\dot{m}(t) \qquad (3)$$

where $E_{wasted}$ is the wasted energy (e.g., thermal energy, the energy that is not converted from chemical energy to mechanical energy, etc.) transferred into the engine 111 (e.g., engine metal, engine block, etc.) during operation. The overall engine temperature may be determined based on the wasted energy transferred to the engine 111 since start-up, and therefore determine whether the overall engine temperature has stabilized (e.g., whether the temperature of the engine 111 exceeds the minimum engine temperature threshold, etc.).

In other embodiments, the overall engine temperature is determined from the total fuel energy consumed by the engine 111 by calculating a heavily filtered engine output power. In one embodiment, for example, various parameters or data (e.g., duration of engine operations, fuel mass flow rate, engine speed, external temperature, engine efficiency, etc.) may be acquired by one or more sensors 140. The acquired data may be used to determine the engine output power and thus the temperature of the engine 111 via an algorithm stored within the engine temperature module 157.

In some embodiments, the engine temperature module 157 is further structured to receive and store engine temperature data (e.g., acquired by one or one or more sensors such as sensors 140, etc.) to determine whether the overall engine temperature has stabilized at a temperature that is not excessively hot (e.g., the overall engine temperature is less than a maximum engine temperature threshold, etc.). For example, implementing the stop/start feature may cause engine damage through heat soak-back if the overall engine temperature is substantially high. In one embodiment, the overall engine temperature is compared to a maximum engine temperature threshold to determine whether the maximum engine temperature threshold exceeds the overall engine. In some embodiments, for the stop/start feature to be implemented, the overall engine temperature lies within an overall engine temperature range (e.g., between the minimum engine temperature threshold and the maximum engine temperature threshold). As such, the implementation of the stop/start feature may be based on the engine temperature or the temperature of specific engine components (e.g., compression chamber, starter system, pistons, piston engine valves, etc.). More specifically, in some embodiments, the implementation of the stop/start feature is based on the overall engine temperature of the engine 111 exceeding the minimum engine temperature threshold. In some embodiments, the implementation of the stop/start feature is based on the maximum engine temperature threshold exceeding the overall engine temperature. In some embodiments, the implementation of the stop/start feature is based on the overall engine temperature of the engine 111 exceeding the minimum engine temperature threshold and the maximum engine temperature threshold exceeding the overall engine temperature.

In one embodiment, the determination of whether the overall engine temperature has stabilized below the maximum engine temperature threshold is based on a total engine run time of the engine 111 since dropping below a threshold power level. For example, the engine 111 may be run at a high power output above the threshold power level for a duration of time such that the engine temperature exceeds the maximum engine temperature threshold. This prohibits the stop/start feature from being implemented in order to prevent damage to the engine 111 (e.g., from heat-soak, etc.). As such, based on the total run time of the engine 111 below the threshold power level, the engine temperature may stabilize below the maximum engine temperature threshold, facilitating the implementation of the stop/start feature (e.g., if the other protective criteria are met as well, etc.).

In another embodiment, the determination of whether the overall engine temperature has stabilized below the maximum engine temperature threshold is based on a recent amount of energy consumed (or amount of energy wasted) by the engine 111. For example, the recent amount of energy consumed by the engine may be indicated by calculating a moving average of engine output power, by calculating a heavily filtered engine output power (possibly the same filtered engine power used to indicate warm-up), and so on.

As shown in FIG. 3, the stop/start module 158 may be operatively coupled to the engine 111, the engine friction module 155, the exhaust module 156, and/or the engine temperature module 157, among other modules and components. In some embodiments, the stop/start module 158 is structured to receive the engine operation data from the various modules of the controller 150 (e.g., the engine friction module 155, the exhaust module 156, the engine temperature module 157, etc.). The stop/start module 158 may determine whether the stop/start feature may be implemented based on the engine operation data (e.g., engine friction data, exhaust aftertreatment temperature data, engine temperature data, etc.) received from each of the modules of controller 150 and the predetermined protective criteria (e.g., user defined via the operator I/O device 130, preset within the controller 150, etc.). The predetermined protective criteria may include indicators (e.g., parameters, thresholds, etc.) that indicate safe implementation of the stop/start feature. In some embodiments, the indicators include, but are not be limited to, (i) the engine friction amount is less than the engine friction threshold (e.g., assuring easy restart of the engine 111 after the stop/start feature is implemented, etc.), (ii) the exhaust aftertreatment exceeds the exhaust aftertreatment temperature threshold (e.g., supporting the required chemical reactions to meet emission requirements, etc.), (iii) the overall engine temperature has stabilized at a temperature that exceeds the minimum engine temperature threshold, and (iv) the overall engine temperature has stabilized at a temperature less than the maximum engine temperature threshold (e.g., preventing damage to the engine 111 through heat-soak, etc.).

In some embodiments, the stop/start module 158 determines whether the stop/start feature may be implemented in which the engine 111 is turned off for at least a portion of time (e.g., until a command to restart the engine 111, etc.) based on the acquired engine operation data satisfying the predetermined protective criteria. In some embodiments, the stop/start module 158 implements the stop/start feature based on at least one of the engine friction threshold exceeding the engine friction amount, the temperature of the exhaust aftertreatment system exceeding the exhaust aftertreatment temperature threshold, the overall temperature of the engine exceeding the minimum engine temperature threshold, and the maximum engine temperature threshold exceeding the overall temperature of the engine.

Figure 4:
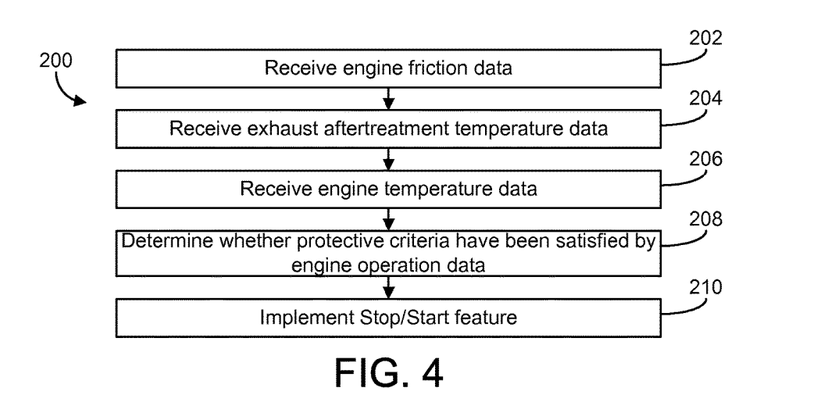
FIG. 4 is a flow diagram of a method of implementing a stop/start engine feature, according to an exemplary embodiment.

Referring now to FIG. 4, a method 200 of implementing a stop/start engine feature is shown according to an exemplary embodiment. In one exemplary embodiment, method 200 may be implemented with the controller 150 and the various modules of FIGS. 1-3. For example, at process 202, engine friction data indicative of an engine friction amount for an engine is received. The engine friction module 155 may receive the engine friction data from one or more sensors 140, as described above. The sensors 140 may include at least one of an engine oil temperature sensor, an engine oil pressure sensor, and an engine fuel gauge configured to acquire the engine friction data. The engine friction data may include a temperature, a viscosity, a pressure of the engine oil, and/or an amount of fueling required to idle the engine 111 at a constant speed. At process 204, exhaust aftertreatment temperature data indicative of a temperature of an exhaust aftertreatment system is received. The exhaust module 156 may receive exhaust aftertreatment temperature data from one or more sensors 140, as described above. The sensors 140 may include an exhaust aftertreatment temperature sensor configured to acquire data regarding the temperature of the exhaust aftertreatment system 122.

At process 206, engine temperature data indicative of an overall temperature of the engine is received. The engine temperature module 157 may receive engine temperature data regarding the temperature of the engine 111 (e.g., stabilization at warm-up temperature, stabilization at non-excessively hot temperature, etc.) acquired by one or more sensors 140, as described above. By way of example, the sensors 140 may include an intake manifold temperature sensor configured to acquire temperature data regarding the engine 111. In another example, the controller 150 may determine the temperature of the engine 111 based on the engine run time. In yet another example, the controller 150 may determine the temperature of the engine 111 based on the wasted energy (e.g., Equations (1)-(3), etc.), as described above.

Processes 202-206 are shown as independent processes in FIG. 3. In some embodiments, the order in which the engine operation data is received may be different than is depicted in FIG. 3. In other embodiments, processes 202-206 may be combined such that the engine operation data (e.g., engine friction data, exhaust aftertreatment temperature data, engine temperature data, etc.) are received simultaneously by the respective modules of the controller 150.

For example, at process 208, the engine operation data is compared to protective criteria. The stop/start module 158 determines whether the protective criteria have been satisfied by the engine operation data. For example, the engine friction data may be compared to an engine friction threshold to determine whether the engine friction amount is less than the engine friction threshold (e.g., to assure substantially easy engine restart after the implementation of the stop/start feature, etc.). As such, the implementation of the stop/start feature may be based on the engine friction data. The exhaust aftertreatment temperature data may be compared to an exhaust aftertreatment temperature threshold to determine whether the exhaust aftertreatment temperature is sufficient (e.g., above the exhaust aftertreatment temperature threshold, etc.) to support required chemical reactions (e.g., to reduce emissions, etc.). As such, the implementation of the stop/start feature may be based on the exhaust aftertreatment temperature. The engine temperature data may be compared to an engine temperature range defined by a minimum engine temperature threshold and a maximum engine temperature threshold, as described above. As such, the implementation of the stop/start feature may be based on the engine temperature.

For example, at process 210, the stop/start feature is implemented such that a stop command is provided to the engine to turn it off for a period of time. For example, when the vehicle 100 is at rest (e.g., stopped, the brake pedal is pressed, etc.) the stop/start feature is implemented to stop the engine 111 based on the engine operation data satisfying the protective criteria. In one embodiment, following the implementation of the stop/start feature, the controller 150 awaits a start command (e.g., a signal from an accelerator pedal, etc.) to restart the engine and may continue method 200 in a loop. When a command to restart the engine is received (e.g., from pressing the accelerator pedal, etc.), the engine 111 is restarted by the controller 150 to provide the required power to move the vehicle 100. Conversely, in some embodiments, the stop/start feature may not be implemented until the engine operation data satisfy the protective criteria. In alternate embodiments, the stop/start feature may be implemented based on at least one of the protection criteria (e.g., the engine friction threshold, the exhaust aftertreatment temperature threshold, the minimum engine temperature threshold, the maximum engine temperature threshold, etc.) being satisfied by the engine operation data (e.g., the engine friction data, the exhaust aftertreatment temperature data, the engine temperature data, etc.).

Figure 5:
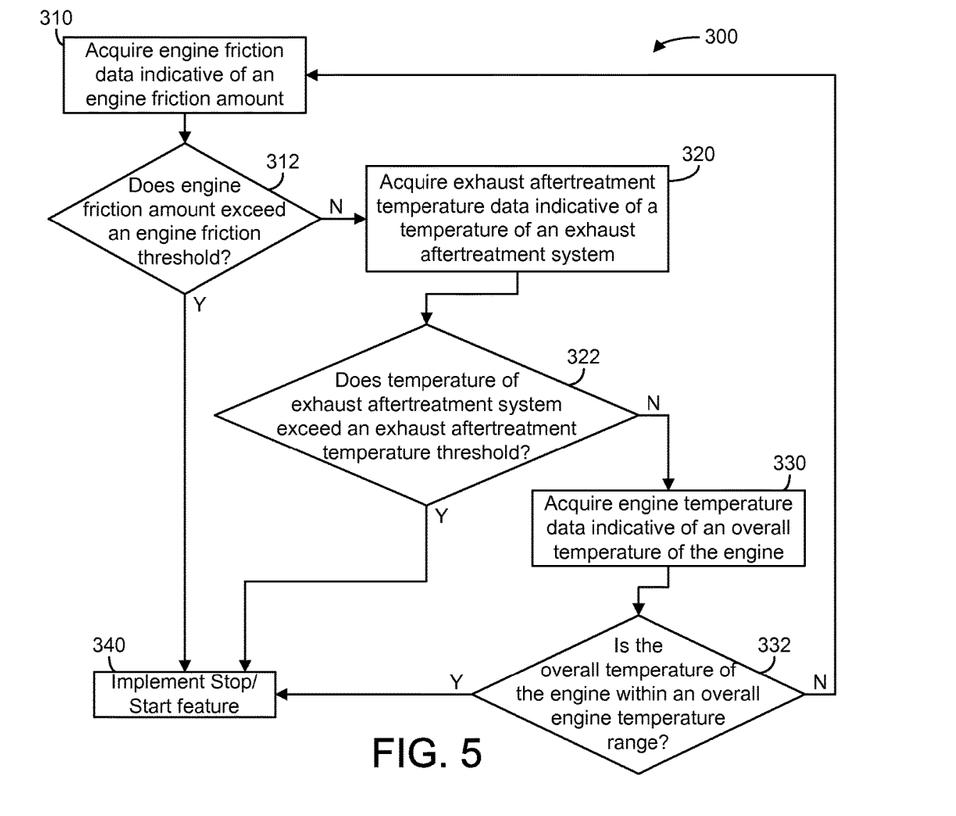
FIG. 5 is a flow diagram of a method of implementing a stop/start engine feature, according to another exemplary embodiment.

Referring now to FIG. 5, a method 300 of implementing a stop/start engine feature is shown according to another embodiment. In one exemplary embodiment, method 300 may be implemented with the controller 150 and the various modules of FIGS. 1-3. In some embodiments, at process 310, the controller 150 acquires engine friction data indicative of an engine friction amount. In one embodiment, at process 312, the controller 150 determines if the engine friction amount exceeds an engine friction threshold. Accordingly, the controller 150 may implement the stop/start feature based on the engine friction threshold exceeding the engine friction amount (process 340). In one embodiment, the controller 150 acquires exhaust aftertreatment temperature data indicative of a temperature of an exhaust aftertreatment system based on the engine friction amount exceeding the engine friction threshold (process 320). At process 322, the controller 150 may determine if the temperature of the exhaust aftertreatment system exceeds an exhaust aftertreatment temperature threshold. Accordingly, the controller 150 may implement the stop/start feature based on the temperature of the exhaust aftertreatment system exceeding the exhaust aftertreatment temperature threshold (process 340). In one embodiment, the controller 150 acquires engine temperature data indicative of an overall temperature of an engine based on the exhaust aftertreatment temperature threshold exceeding the temperature of the exhaust aftertreatment system (process 330).

For example, at process 332, the controller 150 determines if the overall temperature of the engine is within an overall engine temperature range (i.e., between a minimum and maximum engine temperature threshold, etc.). Accordingly, the controller 150 may implement the stop/start feature based on the overall temperature of the engine being within the overall engine temperature range (process 340). In one embodiment, the controller 150 may return to process 310 based on the overall temperature of the engine being outside of the overall engine temperature range. In one embodiment, following process 340 (e.g., turning off the engine, etc.), the controller 150 awaits a start command (e.g., a signal from an accelerator pedal, etc.) to restart the engine. When a command to restart the engine is received (e.g., from pressing the accelerator pedal, etc.), the engine is restarted by the controller 150. Accordingly, in some embodiments, the controller 150 repeats method 300 during operation of the engine. As shown in FIG. 5, the implementation of the stop/start feature may be based on one of the protective criteria being met by the engine operation data. In some embodiments, the implementation of the stop/start feature may be based on any combination of the engine friction data, the exhaust aftertreatment temperature data, and the engine temperature data.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
    an engine friction module in operative communication with an engine and structured to interpret engine operation data indicative of an engine friction amount; and
    a stop/start module structured to:
    compare the interpreted engine operation data with predetermined protective criteria based on an engine friction threshold; and
    turn off the engine for at least a portion of time based on the engine friction threshold exceeding the engine friction amount;
    wherein the engine friction amount is based on an engine rotational friction amount; and wherein the engine rotational friction amount is based on an amount of fuel used to idle the engine at a constant speed.

2. The apparatus of claim 1, wherein the engine friction amount is based on at least one of an engine oil temperature, an engine oil viscosity, and an engine oil pressure.

3. An apparatus, comprising:
an engine friction module in operative communication with an engine and structured to interpret engine operation data indicative of an engine friction amount; and
a stop/start module structured to:
compare the interpreted engine operation data with predetermined protective criteria based on an engine friction threshold; and
turn off the engine for at least a portion of time based on the engine friction threshold exceeding the engine friction amount;
wherein the stop/start module is structured to turn off the engine further based on a maximum engine temperature threshold exceeding an overall temperature of the engine, wherein the overall temperature of the engine indicates the engine friction amount.

4. The apparatus of claim 3, wherein the overall temperature of the engine is based on at least one of a total engine run time since starting the engine, an engine runtime since dropping below a predetermined power level, and a wasted energy since starting the engine.

5. The apparatus of claim 3, wherein the overall temperature of the engine is based on a recent energy consumed by the engine.

6. The apparatus of claim 5, wherein the recent energy consumed is based on at least one of an engine output power, a moving average of the engine output power, and a heavily filtered value of the engine output power.

7. An apparatus, comprising:
an exhaust module in operative communication with an engine and structured to interpret engine operation data indicative of a temperature of an exhaust aftertreatment system; and
a stop/start module structured to:
compare the interpreted engine operation data with predetermined protective criteria, wherein the predetermined protective criteria includes an exhaust aftertreatment temperature threshold; and
turn off the engine for at least a portion of time based on the temperature of the exhaust aftertreatment system exceeding the exhaust aftertreatment temperature threshold;
wherein the stop/start module is structured to turn off the engine further based on a maximum engine temperature threshold exceeding an overall temperature of the engine.

8. The apparatus of claim 7, wherein the exhaust aftertreatment system is a selective catalytic reduction aftertreatment system.

9. The apparatus of claim 8, wherein the temperature of the exhaust aftertreatment system is based on an overall temperature of the exhaust aftertreatment system.

10. The apparatus of claim 8, wherein the temperature of the exhaust aftertreatment system is based on a temperature of particles passing through a particulate filter.

11. The apparatus of claim 8, wherein the temperature of the exhaust aftertreatment system is based on a temperature of a selective catalytic reduction catalyst.

12. The apparatus of claim 8, wherein the temperature of the exhaust aftertreatment system is based on a temperature of a diesel particulate filter inlet.

13. An apparatus, comprising:
an engine friction module in operative communication with an engine and structured to interpret engine operation data indicative of an engine friction amount;
an exhaust module in operative communication with the engine and structured to interpret engine operation data indicative of a temperature of an exhaust aftertreatment system;
and a stop/start module structured to:
compare the interpreted engine operation data with predetermined protective criteria, wherein the predetermined protective criteria includes an engine friction threshold and an exhaust aftertreatment temperature threshold; and
turn off the engine for at least a portion of time based on the engine friction threshold exceeding the engine friction amount and based on the temperature of the exhaust aftertreatment system exceeding the exhaust aftertreatment temperature threshold;
wherein the stop/start module is structured to turn off the engine further based on a maximum engine temperature threshold exceeding an overall temperature of the engine.

14. The apparatus of claim 13, wherein the overall temperature of the engine is based on a total engine run time since dropping below a predetermined power level.

15. The apparatus of claim 13, wherein the engine friction amount is based on at least one of a viscosity, a pressure, and a temperature of engine oil.

16. The apparatus of claim 13, wherein the exhaust aftertreatment system is a selective catalytic reduction aftertreatment system.

17. The apparatus of claim 16, wherein the temperature of the exhaust aftertreatment system is based on a temperature of a diesel particulate filter inlet.

18. A method, comprising:
interpreting, by an engine friction module in operative communication with an engine, engine operation data indicative of an engine friction amount;
comparing, by a stop/start module, the interpreted engine operation data with predetermined protective criteria based on an engine friction threshold; and
turning off, by the stop/start module, the engine for at least a portion of time based on the engine friction threshold exceeding the engine friction amount;
wherein turning off the engine is further based on a maximum engine temperature threshold exceeding an overall temperature of the engine.

19. The method of claim 18, wherein the overall temperature of the engine is based on a total engine run time since dropping below a predetermined power level.

20. The method of claim 18, wherein the engine friction amount is based on an engine rotational friction amount.

21. The method of claim 20, wherein the engine rotational friction amount is based on at least one of an amount of fuel used to idle the engine at a constant speed and a total fueling since initially starting the engine.

* * * * *